INVENTORS:
HANS-RUDOLF JACOBI
ABEL HAUSER
MANFRED HOFFMANN

United States Patent Office 3,642,974
Patented Feb. 15, 1972

3,642,974
**PROCESS FOR THE MANUFACTURE OF MOLD-
INGS OF POLYLACTAMS BY ACTIVATED ANI-
ONIC POLYMERIZATION OF LACTAMS**
Hans-Rudolf Jacobi, Mannheim, Abel Hauser, Bruehl-
Rohrhof, and Manfred Hoffmann, Mannheim, Ger-
many, assignors to Badische Anilin- & Soda-Fabrik
Aktiengesellschaft, Ludwigshafen (Rhine), Germany
Filed July 2, 1970, Ser. No. 51,972
Claims priority, application Germany, July 7, 1969,
P 19 34 305.6
Int. Cl. B29g 1/00
U.S. Cl. 264—294                                    3 Claims

ABSTRACT OF THE DISCLOSURE

A process for the manufacture of polyamide moldings by activated anionic polymerization of lactams in a compression mold heated to the temperature of polymerization and provided with a plunger, the process comprising charging the mold with a melt of lactam, activator and catalyst in an amount such as is required for the production of the molding, immersing the plunger in the melt so that the latter completely fills the mold, compensating for contraction of the melt during polymerization by advancing the plunger without applying pressure to the melt, and, when no further contraction takes place, closing the mold under pressure and thus giving the polymer its final shape.

---

Figure 1:
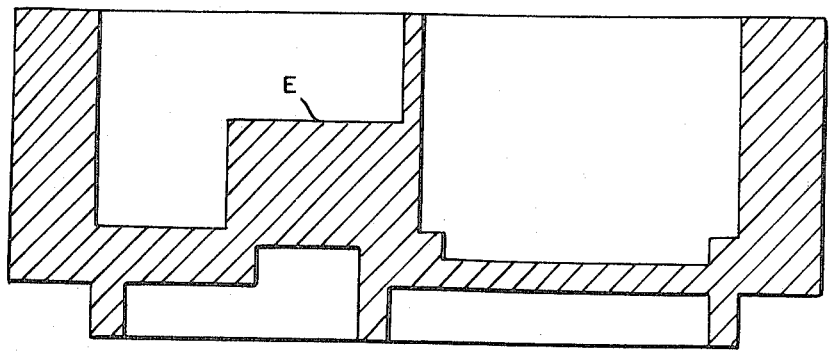

This invention relates to a process for the manufacture of moldings of polyamides produced by the activated anionic polymerization (AAP) of lactams.

It is known to make moldings of polyamides by injection molding involving the injection under pressure of fully condensed or fully polymerized polyamides in the molten state into a mold. During injection the mold opens to a certain extent; it closes to the same extent after injection has been completed. This measure combined with appropriate selection of the extent to which the mold opens ensures that the contraction arising during cooling of the molded article is fully compensated for.

It is also known to make moldings of polylactams by activated anionic polymerization by charging a compression mold heated to polymerization temperature with a mixture of lactam monomers, catalyst and activator, also preheated to polymerization temperature, and allowing the mixture to polymerize in the mold. When the viscosity of the mixture has risen due to partial polymerization, a plunger (upper part of the mold) is inserted into the mold to give the mixture its final shape. Polymerization is then completed whilst maintaining the mixture in the said shape. The drawback of this method is that the contraction cannot be fully compensated for due to the early complete closure of the mold. This results in flaws, particularly in the case of thick-walled moldings. If, on the other hand, the polymer is molded at a later stage, for example towards the end of the polymerization process or just before the commencement of crystallization, or at a stage where these two processes can overlay, a marked white, monomer-containing rim is formed on the outer surface of the shaped article at the level of the surface of the molten mixture. This is due to the surface of the mixture cooling whilst in contact with air before the mold is closed. Increasing the temperature of the plunger dipped in the mixture cannot bring about completion of the interrupted polymerization. Moreover, joint lines are formed, particularly when the composition has to flow around cores and mold inserts.

It is an object of the invention to provide a process for the production of flawless moldings of any desired shape and composed of polylactams by activated anionic polymerization of lactams containing from 5 to 13 ring members. It is a further object of the invention to provide a process for the economic mass-production of moldings with greatly varying wall thicknesses over any desired period of time. It is yet another object of the invention to provide a method of marking very large and heavy moldings with the aid of small machines.

These objects are achieved by a process comprising charging the activity of a compression mold heated at the polymerization temperature and provided with a plunger with a mixture of lactam, catalyst and activator, also preheated to the polymerization temperature, and allowing such mixture to polymerize in the mold, wherein the mold is filled with that amount of lactam, catalyst and activator which is required to produce the desired molding, the mold is closed to such an extent that the plunger, which is preheated to the polymerization temperature, is immersed in the polymerizing melt to such a depth that the said melt completely fills the mold cavity, and the contraction of the polymerizing melt occurring during polymerization is compensated for by advancing the plunger without applying pressure on the melt, the mold thus remaining completely filled at all times, and, when no further contraction takes place and while the polylactam is still plastic but no longer flowable, the mold is completely closed and and the molding compressed and shaped in all details.

Particularly suitable lactams for use in the process of the invention are, for example, caprolactam, enantholactam, capryllactam, capric lactam, lauryllactam or C-substituted derivatives thereof, such as 3-methyl caprolactam and 4-isopropyl caprolactam. Mixtures of these lactams may also be used. The said lactams may additionally contain lactams bonded together by a bridging member, such as methylene-bis-caprolactam. Caprolactam is preferred.

Suitable polymerization catalysts are the well-known alkaline catalysts, particularly the alkaline lactams such as are described in German patent specification No. 1,067,587, for example. They are generally used in proportions ranging from 0.01 to 10%, preferably from 0.1 to 5%, by weight with reference to the total weight of the polyamide-forming starting materials. For special applications, however, quantities above or below those stated may be used. Mixtures of catalysts are also suitable.

Suitable activators are, for example, N-acyl lactams, isocyanates, N-cyanolactams, substituted ureas, reaction products of carbamic chlorides with heterocyclic compounds such as imidazole, etc. Particularly suitable activators are bifunctional carbamoyl lactams, particularly bifunctional aliphatic carbamoyl lactams, such as may be made by reacting diisocyanates or dicarbamic chlorides with lactams, e.g. 1,6-bis-(caprolactam-N-carbonyl-amino)-hexane or 1,6 - bis - (capryllactam-N-carbonyl-amino)-hexane. These materials are used in proportions ranging from 0.05 to 10%, preferably from 0.1 to 5%, by weight with reference to the total weight of the polyamide-forming starting materials.

Additives of appropriate particle size and density may be used to fulfil the functions of reinforcing materials, fillers, lubricants, delustering agents, dyes or stabilizers, provided they do not interfere with the anionic lactam polymerization. Suitable additives are, for example, porous metal powders, pigments and kieselguhr. Suitable reinforcing agents are, for example, hollow glass fibers or organic fibers.

The process of the invention is conveniently carried out by charging a mixture of lactam and catalyst into one storage vessel and a mixture of lactams and activator into another storage vessel, melting the lactams or lactam mixtures therein and preferably maintaining them (during one shift) at their melting point or at a temperature above their melting point, preferably from 5 to 10° C. above their melting point. From each of the storage vessels that quantity of mixture is withdrawn which is required to give the desired concentration of catalyst and activator when charging the mold or molds (in the case of multiple molds), and these quantities are charged into separate heated vessels held at the desired temperature of polymerization, which is preferably a temperature of from 80° to 180° C., temperatures ranging from 120° to 160° C. being preferred for the polymerization of caprolactam and from 90° to 140° C. for the polymerization of capryllactam. The two heated vessels may be continuous-flow heaters. The molten lactam leaving each of the said vessels is fed, either directly or via a discharge pipe, to a mixing unit comprising, for example, a mixing tube or a mixing nozzle, from which the combined streams, either already fully mixed or in the process of being mixed, pass into the mold cavity through a sprue. In general, gravity feeding is employed. Alternatively, however, the lactam melts may be fed to the mold cavity by gas pressure or they may be pumped into the mold. Gases used for this purpose are preferably inert gases such as nitrogen or argon. It is very important that the lactam melts be thoroughly mixed during charging into the mold cavity. Generally speaking, the streams are adequately mixed by the turbulence caused when they meet in the mixing unit after leaving the heating vessels.

The temperature of the compression mold must be selected to suit the lactam used and the nature and amount of the catalysts and activators used. It ranges from 80° to 200° C., preferably from 125° to 180° C. for the polymerization of caprolactam and from 95° to 140° C. for the polymerization of capryllactam.

Specifically, the process is carried out by feeding the mixture of lactam, catalyst and activator which has been heated to the polymerization temperature, into the cavity of a compression mold, which has also been preheated to the reaction temperature, and then immediately dipping the plunger, also heated to reaction temperature, that is, a temperature of from 80° to 180° C., into the mixture until the latter completely fills the mold cavity without overflowing. The lactam mixture in the mold cavity then begins to polymerize and to shrink.

The polymerizing mixture reacts exothermally. Thus the temperature of the mixture rises and reaches its maximum, of course, at the center of the mixture. The temperature may rise by as much as 50° C. depending on the formulation used and the starting temperature; however, it should not be such that the melting point of the polylactam formed is exceeded.

The plunger in the mold cavity is slowly advanced at a rate corresponding to the rate of contraction, that is, shrinkage, of the polymerizing lactam mixture, so that the cavity is reduced in size and has a volume equal to that of the lactam mixture at all times. If the plunger advance is effected vertically downwardly, the charge in the mold cavity fills the same right up to the edge of the lower fixed part of the compression mold during the entire polymerization reaction. The plunger advance may be effected manually or automatically by means of programmed control. During this advancing operation no pressure is applied to the polymerizing lactam mixture whilst the latter is still flowable. Towards the end of the polymerization reaction, that is, after a period of from 10 to 120 seconds, preferably of from 20 to 80 seconds, after the commencement of polymerization, substantially no further contraction takes place. At this stage the polymer formed is dimensionally stable, that is to say, it is still plastically deformable but is no longer capable of flowing under its own weight. This particular stage may usually be recognized in the present case by an increasing resistance to further advance of the plunger, as may be noted from the manometer of the press. The pressure then applied is conveniently one of from 200 to 800, preferably of from 300 to 600 kg./cm.$^2$, the mold being closed. This causes the polylactam to take the exact shape of the mold cavity and the polylactam is highly compressed. Without these measures—compensation for volume reduction by advancing the plunger and compression of the polymer—it is not possible to obtain molded articles which are free from shrinkage holes and surface blemishes. The molding is removed from the mold whilst still hot after the polylactam has solidified by crystallization to such an extent that the ejection pins can no longer penetrate the surface of the molding.

The process of the invention enables polyamide moldings of any shape and of greatly varying wall thicknesses to be mass-produced in an economical manner over any desired period of time.

Another great advantage of the process of the invention is that it enables both small and very large and heavy moldings to be made with the use of relatively small machines. The manufacture of moldings weighing up to 15 kg. and more presents no difficulties from the point of view of process technology or in respect of the machines required. Polyamide moldings weighing from 300 to 1,500 g. may be manufactured especially economically. The moldings thus obtained are free from contraction cavities and, in particular, they are very strong and have high impact strength and good thermal stability. Examples of such moldings are machine parts such as gearwheels, bearing boxes, coupling members, casing parts, apparatus parts, etc.

The following examples illustrate the process of the invention.

EXAMPLE 1

A polycaprolactam casing is made by the process according to this invention involving activated anionic polymerization. The casing, weighing about 300 g., is sketched in the accompanying FIG. 1. Of particular note are the considerable differences in wall thickness. The formation of flaws is particularly likely at point E but is reliably prevented by the molding process described below.

In two storage vessels of a melting and metering plant there are melted 12 kg. of caprolactam together with 295 g. of sodium caprolactam, in one vessel, and 11.8 kg. of caprolactam together with 492 g. of 1,6-bis-(caprolactam-N-carbonylamino)-hexane, in the other vessel, the two mixes being held at 80° C. From each vessel an amount of 155 g. of mix, as is required for one cycle of operations, is withdrawn, and the two batches are fed to separate heated vessels, where they are heated to 140° C. in 1.5 minutes with stirring. After reaching this temperature the two mixes are fed simultaneously through separate heated discharge tubes ending in a common nozzle into the cavity of the compression mold preheated at 145° C., whereupon the plunger is immediately advanced into the liquid mixture so that the latter fills up to the mold cavity without overflowing. At this stage the compression mold is still open by approximately 7 mm. as measured in the parting plane. Once polymerization begins the level of the polymer composition begins to fall so that the plunger has to be advanced by about 6 mm. by means of programmed control, without applying pressure. In this way the mold cavity is continuously reduced in size to agree with the volume of the polymerizing lactam mixture. In the final stage of polymerization the compression mold is closed by advancing the plunger through 1 mm. The pressure thus applied to the molding compresses it and causes it to be shaped in all details. The whole closing operation including shaping and compressing requires 30 seconds. The static pressure used for shaping is 300 kg./cm.$^2$, and the average rate of advance of the plunger is 0.23 mm./s. Two minutes after pressure has been applied the polymer has crystallized to such an extent that the molding may be removed from the mold by the ejector pins without any damage being caused to the surface of the molding. The molding obtained has no flaws and shows a smooth, glossy surface without sink marks. No holes occur, even though the differences in wall thickness are extreme. A shaped article made, for the purpose of comparison, by conventional compression molding showed surface flaws and numerous shrinkage holes, particularly in the region designated by E.

EXAMPLE 2

A bearing bush having an outside diameter of 40 mm., a wall thickness of 3 mm. and a length of 90 mm. is to be made, by compression molding, of polyamide produced by activated anionic lactam polymerization. The weight of the molding is 36 g. A total of 38 g. of a mixture of lactams, activator and catalyst of the composition given in Example 1, heated at 150° C., is charged into the cavity of the compression mold, heated at 155° C., for polymerization.

Figure 2:
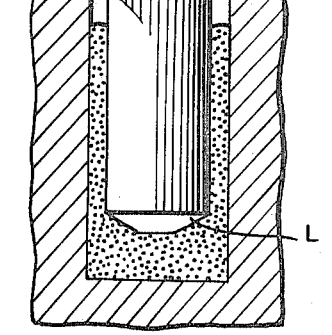
Figure 3:
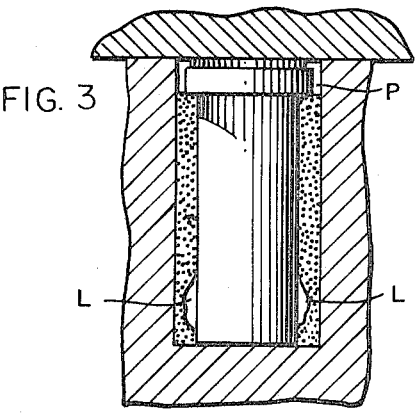

If the mold is fully closed immediately after charging, the molding thus produced shows a large number of holes and sink marks. The molding also shows shrinkage holes L or flaws if the plunger of the mold is dipped into the polymerizing mixture until the mold cavity is full but does not overflow, the plunger then being held in this position until polymerization has proceeded to such an extent that the polymer has become stiff and can no longer flow under its own weight, whereupon the mold is rapidly closed under pressure. These poor results are explained by FIG. 2. The contraction of the mixture during the polymerization process causes the level of the polymer to drop, and this results in the formation of cavities, particularly below the plunger. During compression in the final stage of polymerization the outer skin which has formed at the cavities and which is already very tough is displaced and folded and reproduced in the shaped article, as is diagrammatically shown in FIG. 3.

Figure 4:
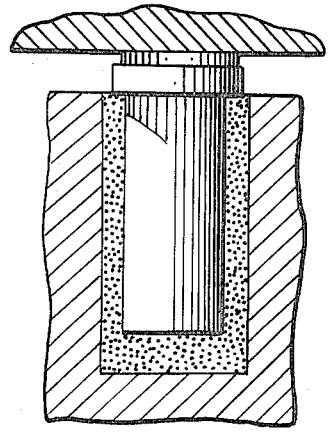
Figure 5:
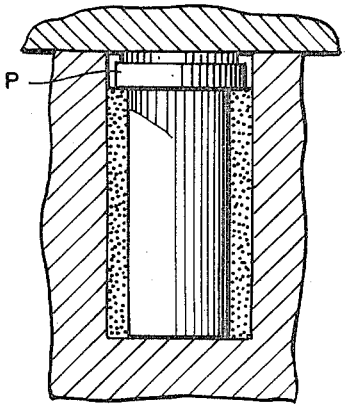

The deficiencies outlined above may be avoided by utilizing the molding process of the invention, that is, by continuously altering the size of the mold cavity to agree with the volume of polymer during the course of the reaction (FIG. 4) and effecting compression in the final stage of polymerization (FIG. 5). Completely satisfactory moldings are obtained in a cycle lasting two minutes. The slight excess of composition forms a flash P. The dimensions are within narrow tolerance limits, so that no machining is required except for deflashing.

We claim:
1. A process for the production of moldings composed of polylactams formed by activated anionic polymerization of lactams having from 5 to 13 ring members by charging the cavity of a compression mold heated at a temperature of from 80° to 200° C. and provided with a plunger with a mixture of lactam, catalyst and activator, preheated to the polymerization temperature of from 80° to 180° C., and allowing said mixture to polymerize in the mold, comprising
  (a) charging the mold with the amount of lactam, catalyst and activator required for one molding;
  (b) closing the mold to such an extent that the plunger, heated at a temperature of from 80° to 180° C., is immersed in the polymerizing melt to such a depth that the said melt completely fills the mold cavity;
  (c) compensating for the contraction of the polymerizing melt occurring during polymerization by advancing the plunger without applying pressure to the melt, so that the mold remains completely full at all times;
  (d) completely closing the mold and finally shaping the polylactam under pressure when no further contraction takes place, at which stage the polylactam is still plastic but no longer capable of flow under its own weight.
2. A process as claimed in claim 1 wherein shaping of the molding under pressure in the mold is carried out from 10 to 120 seconds after the commencement of polymerization.
3. A process as claimed in claim 1 wherein the pressure applied for final shaping of the molding is from 200 to 800 kg./cm.²

References Cited
UNITED STATES PATENTS

| | | | |
|---|---|---|---|
| 3,222,443 | 12/1965 | Dames | 264—331 X |
| 3,265,797 | 8/1966 | Spaak | 264—235 |
| 3,278,654 | 10/1966 | Grandperret | 264—331 X |
| 3,505,448 | 4/1970 | Zijp | 264—331 X |
| 3,511,845 | 5/1970 | Scalora | 264—325 X |

ROBERT F. WHITE, Primary Examiner

R. R. KUCIA, Assistant Examiner

U.S. Cl. X.R.

260—78 L; 264—325, 331